(12) United States Patent
Kondou et al.

(10) Patent No.: US 9,329,340 B2
(45) Date of Patent: May 3, 2016

(54) OPTICAL MODULATOR

(75) Inventors: Katsutoshi Kondou, Chiyoda-ku (JP);
Satoshi Oikawa, Chiyoda-ku (JP); Toru Sugamata, Chiyoda-ku (JP)

(73) Assignee: SUMITOMO OSAKA CEMENT CO., LTD., Chiyoda-Ku, Tokyo (JP)

( * ) Notice: Subject to any disclaimer, the term of this patent is extended or adjusted under 35 U.S.C. 154(b) by 928 days.

(21) Appl. No.: 13/138,809

(22) PCT Filed: Mar. 30, 2010

(86) PCT No.: PCT/JP2010/055642
§ 371 (c)(1),
(2), (4) Date: Sep. 30, 2011

(87) PCT Pub. No.: WO2010/113921
PCT Pub. Date: Oct. 7, 2010

(65) Prior Publication Data
US 2012/0027337 A1 Feb. 2, 2012

(30) Foreign Application Priority Data

Mar. 31, 2009 (JP) .................. 2009-084344

(51) Int. Cl.
*G02F 1/035* (2006.01)
*G02B 6/125* (2006.01)
(Continued)

(52) U.S. Cl.
CPC ............ *G02B 6/125* (2013.01); *G02B 6/29352* (2013.01); *G02F 1/225* (2013.01);
(Continued)

(58) Field of Classification Search
CPC .. G02B 6/125; G02B 6/2813; G02B 6/29352; G02F 2001/212; G02F 2001/217; G02F 1/225; G02F 1/3137; G02F 1/3136

USPC ........ 385/1–10; 359/237, 245, 246, 248, 251, 359/254
See application file for complete search history.

(56) References Cited

U.S. PATENT DOCUMENTS 5,410,625 A 4/1995 Jenkins et al.
5,627,929 A * 5/1997 Vawter et al. ................... 385/45
(Continued)

FOREIGN PATENT DOCUMENTS

JP 5-53086 A 3/1993
JP 5-134220 A 5/1993
(Continued)

OTHER PUBLICATIONS

Optical multi mode interference devices based on self imaging: principles and applications; by Soldano et al; Journal of Lightwave Technology, vol. 13, No. 4, Apr. 1995 pp. 615-627.*
(Continued)

*Primary Examiner* — Thomas A Hollweg
*Assistant Examiner* — Guy Anderson
(74) *Attorney, Agent, or Firm* — Taft Stettinius & Hollister LLP

(57) ABSTRACT

In order to provide an optical modulator capable of suppressing generation of mode mismatching light in the Y-multiplexer in the MZ-type waveguide or mixing of the mode mismatching light with the radiation-mode light or the output light, and separately extracting output light and radiation-mode light, there is provided an optical modulator having a Mach-Zehnder type waveguide on a surface of a dielectric substrate, wherein a waveguide after multiplexing in a Y-multiplexer in an output side of the Mach-Zehnder type waveguide is a multiple mode waveguide 2, a subsidiary output waveguide as a high-order mode waveguide 2 is connected to a portion where the multiple mode waveguide is changed to a main output waveguide 3 as a single mode waveguide, and the multiple mode waveguide 2 has a length equal to or longer than 150 μm.

7 Claims, 4 Drawing Sheets

(51) Int. Cl.
*G02B 6/293* (2006.01)
*G02F 1/225* (2006.01)
*G02F 1/313* (2006.01)
*G02B 6/28* (2006.01)
*G02F 1/21* (2006.01)

(52) U.S. Cl.
CPC .......... *G02B 6/2813* (2013.01); *G02F 1/3136* (2013.01); *G02F 1/3137* (2013.01); *G02F 2001/212* (2013.01); *G02F 2001/217* (2013.01)

(56) References Cited

U.S. PATENT DOCUMENTS

| | | | |
|---|---|---|---|
| 5,757,995 A * | 5/1998 | Chen | G02B 6/125 385/132 |
| 6,400,490 B1 * | 6/2002 | Hosoi | 359/254 |
| 7,362,924 B2 | 4/2008 | Ichioka et al. | |
| 2004/0008944 A1 * | 1/2004 | Johannessen et al. | 385/45 |
| 2004/0170351 A1 * | 9/2004 | Fishman et al. | 385/3 |
| 2005/0225828 A1 * | 10/2005 | Zakhleniuk et al. | 359/247 |
| 2005/0244100 A1 * | 11/2005 | Yang | 385/27 |
| 2008/0002926 A1 | 1/2008 | Kondou et al. | |
| 2009/0067852 A1 * | 3/2009 | Sugiyama | 398/183 |
| 2009/0142015 A1 * | 6/2009 | Ide et al. | 385/2 |
| 2009/0169148 A1 * | 7/2009 | Doerr et al. | 385/3 |
| 2011/0243491 A1 * | 10/2011 | Hashimoto | 385/3 |
| 2012/0027337 A1 | 2/2012 | Kondou et al. | |

FOREIGN PATENT DOCUMENTS

| | | |
|---|---|---|
| JP | 6-503902 A | 4/1994 |
| JP | 2001-281507 A | 10/2001 |
| JP | 2006-276518 A | 10/2006 |
| JP | 2006-284791 A | 10/2006 |
| JP | 2006-301612 A | 11/2006 |
| JP | 2008-89875 A | 4/2008 |
| JP | 2010-237376 A | 10/2010 |

OTHER PUBLICATIONS

High-speed optical modulation based on carrier depletion in a silicon waveguide; by Liu et al; © 2007 Optical Society of America, Jan. 22, 2007 / vol. 15, No. 2 / Optics Express 660.*

Vawter, G.A., et al., "An Integrated Optical XY Coupler for Phase-Sensitive Optical Power Combining and Suppression of Radiated Light," IEEE Photonics Technology Letters, vol. 7, No. 4 (Apr. 1995), pp. 394-396.

* cited by examiner

OPTICAL MODULATOR

TECHNICAL FIELD

The present invention relates to an optical modulator, and more particularly, to an optical modulator having a Mach-Zehnder type waveguide on a surface of an dielectric substrate.

BACKGROUND ART

In the fields of optical communication or optical measurement, optical waveguide elements having optical waveguides on a surface of an dielectric substrate are widely used. Among the optical waveguide elements, an optical modulator having a Mach-Zehnder type waveguide to perform optical modulation such as light intensity modulation is widely used due to advantages such as readiness of integration and high efficient optical modulation.

In the optical modulator having the Mach-Zehnder type waveguide (hereinafter, referred to as a "MZ-type waveguide"), an electric field is applied to at least an arm (branching waveguide) in the MZ-type waveguide to control phases of the light waves propagating through the corresponding arm. In addition, the $LiNbO_3$ substrate is apt to be subject to a drift phenomenon, in which an operational point of the modulation signal is shifted by change of temperature or DC bias control over a long time period. For this reason, as disclosed in PTLs 1 to 3, the DC bias applied to the optical modulator is adjusted to find a suitable operational point by monitoring output light from the optical modulator or radiation-mode light radiated from a Y-multiplexer of the MZ-type waveguide.

As shown in FIG. 1(*a*), in an ideal Y-multiplexer of the MZ-type waveguide, a gap between the branching waveguides in a crotch portion of the Y-multiplexer where two branching waveguides 1 are combined becomes zero so that radiation-mode light (high-order light) is radiated in a place where the shape is changed from the coupling portion 2 to the output waveguide 3 (the boundary between the regions B and C). In addition, it is possible to determine the modulation condition of the optical modulator by monitoring the radiation-mode light (refer to PTL 2).

However, in a shape of the optical waveguide in practice, the gap G between the branching waveguides is rarely set to zero as shown in FIG. 1(*b*). This is because the minimum line width to form the optical waveguide is finite. Due to the influence of such a gap, in a place where the branching waveguides 1 are combined (the boundary between the regions A and B), a mode mismatching between the light waves is generated to produce so-called mode mismatching light, by which a part of the light waves propagating through the waveguide leaks.

The mode mismatching light causes degradation of optical characteristics of the optical modulator. Particularly, because of increasing propagation loss and degradation of an extinction ratio, or since the mode mismatching light interferes with the radiation-mode light, or the mode mismatching light itself is detected by monitoring means, it is disadvantageously difficult to accurately detect the radiation-mode light.

Meanwhile, some attempts have been made to thin the dielectric substrate used in the optical modulator to be equal to or smaller than 20 μm to reduce a drive voltage for driving the optical modulator or matching velocities between the propagation light and the drive signal. However, as disclosed in PTL 4, since the light waves leaking from the optical waveguide propagate through the thinned dielectric substrate while they are constricted within the substrate, it is difficult to separate the radiation-mode light from the mode mismatching light and, in some cases, it is also difficult to separate the signal light from the radiation-mode light.

Furthermore, in the thinned optical modulator, a typical line width of 5 to 7 μm of the optical waveguide is reduced to approximately 2 to 4 μm (the thickness of the substrate reaches several hundreds of micrometers). Therefore, the influence of the gap G in the coupling portion (Y-multiplexer) of the branching waveguide increases in comparison with that of typical portions so that generation of the mode mismatching light becomes significant.

In PTL 4, the applicant discloses a method of forming the Y-multiplexer of the MZ-type waveguide in a 2×3 branching waveguide in order to separate the radiation-mode light from the signal light. However, in the configuration of the 2×3 branching waveguide disclosed in PTL 4, problematically, a part of the mode mismatching light generated when two branching waveguides are combined may be recombined with the optical waveguide and mixed with the radiation-mode light or the output light.

CITATION LIST

Patent Literature

[PTL 1] Japanese Unexamined Patent Application Publication No. 5-53086
[PTL 2] Japanese Unexamined Patent Application Publication No. 5-134220
[PTL 3] Japanese Unexamined Patent Application Publication No. 2001-281507
[PTL 4] Japanese Unexamined Patent Application Publication No. 2006-301612

SUMMARY OF INVENTION

Technical Problem

The present invention is made to solve the above-described problems and to provide an optical modulator capable of suppressing generation of the mode mismatching light in the Y-multiplexer of the MZ-type waveguide or mixing between the mode mismatching light and the radiation-mode light or the output light and efficiently separately extracting the radiation-mode light and the output light.

Solution to Problem

In order to solve the above-described problems, according to claim 1 of the invention, there is provided an optical modulator having a Mach-Zehnder type waveguide on a surface of a dielectric substrate, wherein a waveguide after multiplexing in a Y-multiplexer in an output side of the Mach-Zehnder type waveguide is a multiple mode waveguide, a subsidiary output waveguide as a high-order mode waveguide is connected to a portion where the multiple mode waveguide is changed to a main output waveguide as a single mode waveguide, and the multiple mode waveguide has a length equal to or longer than 150 μm.

According to claim 2 of the invention, in the optical module according to claim 1, the two subsidiary output waveguides may be arranged axisymmetrically with respect to the main output waveguide by interposing the main output waveguide therebetween.

According to claim 3 of the invention, in the optical module according to claim 1 or 2, a width of each of two branching waveguides coupled in the Y-multiplexer may be narrower than a width of the main output waveguide, and a width of the subsidiary output waveguide may be narrower than a width of the branching waveguide.

According to claim 4 of the invention, in the optical module according to any one of claims 1 to 3, a thickness of the dielectric substrate in the optical modulator may be equal to or smaller than 20 μm.

According to claim 5 of the invention, in the optical module according to any one of claims 1 to 4, a high-order mode waveguide divided from the input waveguide may be provided in the middle of the input waveguide before reaching a Y-splitter in an input side of the Mach-Zehnder type waveguide.

Advantageous Effects of Invention

According to claim 1 of the invention, there is provided an optical modulator having a Mach-Zehnder type waveguide on a surface of a dielectric substrate, wherein a waveguide after multiplexing in a Y-multiplexer in an output side of the Mach-Zehnder type waveguide is a multiple mode waveguide, and a subsidiary output waveguide as a high-order mode waveguide is connected to a portion where the multiple mode waveguide is changed to a main output waveguide as a single mode waveguide. Therefore, since there is no region (single mode waveguide) where the mode rarely changes or leakage is generated in the portion where the two branching waveguides are coupled, it is possible to suppress generation of the mode mismatching light. Furthermore, since the multiple mode waveguide has a length equal to or longer than 150 μm, the mode mismatching light generated in the coupling portion of the two branching waveguides is rarely recombined with the main output waveguide or the subsidiary output waveguide in the sense of a distance, and the mode mismatching light is rarely mixed with the radiation-mode light or the output light.

According to claim 2 of the invention, the two subsidiary output waveguides are arranged axisymmetrically with respect to the main output waveguide by interposing the main output waveguide therebetween. Therefore, it is possible to stably extract the radiation-mode light using the subsidiary output waveguide.

According to claim 3 of the invention, a width of each of two branching waveguides coupled in the Y-multiplexer is narrower than a width of the main output waveguide, and a width of the subsidiary output waveguide is narrower than a width of the branching waveguide. Therefore, it is possible to approximately match the mode diameter in the coupling portion of the branching waveguide and the mode diameter of the main output waveguide as the single mode waveguide where the light waves are output in the turned-on state. As a result, it is possible to effectively extract the output light from the main output waveguide.

According to claim 4 of the invention, a thickness of the dielectric substrate is equal to or smaller than 20 μm. Therefore, since the effect of the mode mismatching light is significantly exhibited, it is necessary to suppress the mode mismatching light. For this reason, by applying the configuration of the optical modulator of the invention, it is possible to reduce a drive voltage for driving the optical modulator, match velocities of the drive signal and the propagating light, and suppress the mode mismatching light.

According to claim 5 of the invention, a high-order mode waveguide divided from the input waveguide is provided in the middle of the input waveguide before reaching a Y-splitter in an input side of the Mach-Zehnder type waveguide. Therefore, since the high-order mode light generated in the light input portion and propagating through the input waveguide can be removed from the high-order mode waveguide, it is possible to approximate the dividing ratio of the light waves in the Y-splitter to 1:1. If the dividing ratio is not 1:1, a high-order mode is generated in the Y-multiplexer regardless of the modulation. Such undesired light is mixed with the main output waveguide or the subsidiary output waveguide so as to degrade characteristics of the extinction ratio. By adding the high-order mode waveguide to the input portion, it is possible to further suppress a generation ratio of undesired light.

DESCRIPTION OF EMBODIMENTS

Hereinafter, the optical modulator of the invention will be described in detail.

Figure 1A:
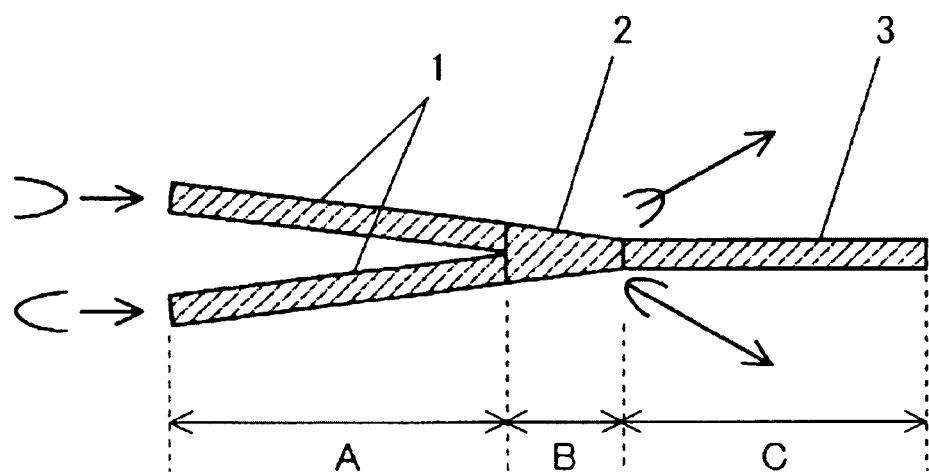
FIGS. 1(*a*) and 1(*b*) are diagrams illustrating a status of generating mismatching light or radiation-mode light in the Y-multiplexer of the MZ-type waveguide.
Figure 1B:
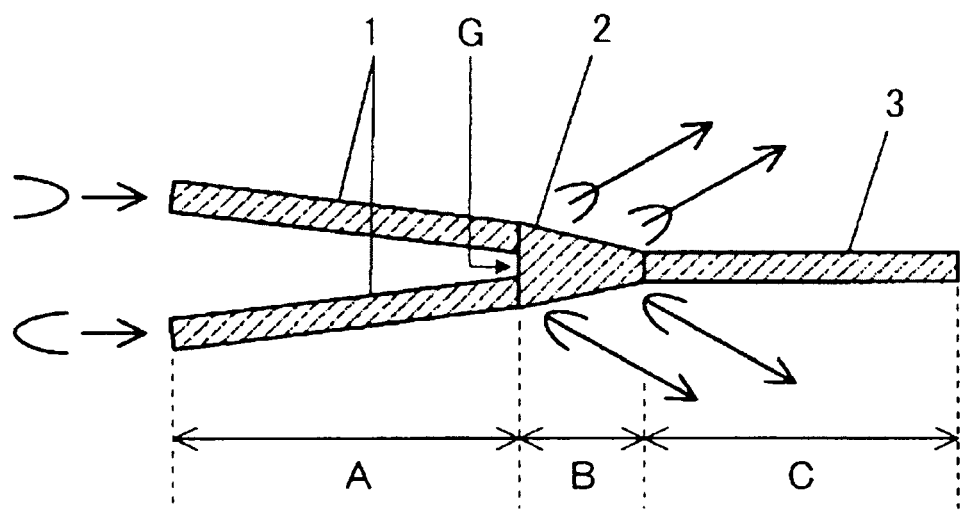
Figure 2:
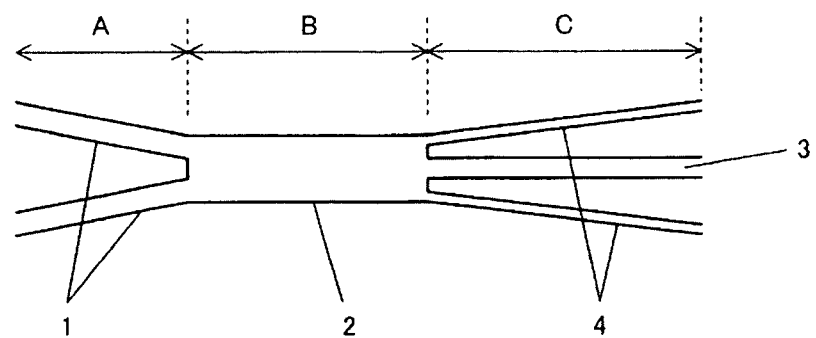
FIG. 2 is a diagram illustrating a shape of the waveguide in the vicinity of the Y-multiplexer used in the optical modulator of the invention.

FIG. 2 is a diagram illustrating a waveguide shape in the vicinity of the Y-multiplexer used in the optical modulator of the invention.

The invention is characterized in that, in the optical modulator having a Mach-Zehnder type waveguide on the surface of the dielectric substrate, the waveguide 2 obtained after multiplexing using the Y-multiplexer in the output side of the Mach-Zehnder type waveguide is a multiple mode waveguide, and a subsidiary output waveguide 4 as a high-order mode waveguide is connected to a portion (the boundary between regions B and C) where the multiple mode waveguide 2 is changed to a main output waveguide 3 as a single mode waveguide. The reference numeral 1 denotes, as an arm of the MZ-type waveguide, two branching waveguides coupled in the Y-multiplexer.

The light intensity Pc of the output light of the optical modulator and the light intensity P± of the radiation-mode light can be expressed in the equation 1 below:

where, $\phi$ denotes a phase difference between each arm of the MZ-type waveguide, $\delta$ denotes a phase difference between a basic mode and a high-order mode in the coupler, and $e^2$ denotes a ratio of leakage in the subsidiary output waveguides in both sides of the basic mode light. Although the light intensity according to the related art does not satisfy the Equation 1 because the mode mismatching light in the Y-multiplexer is recombined with the subsidiary output waveguide as the high-order mode waveguide as described above, the optical modulator according to the invention can obtain a value approximately satisfying the Equation 1.

$$P_x = \frac{1}{2}(\sin^2[\phi] + e^2\cos^2[\phi] \pm e\cos[\delta]\sin[2\phi])$$ [Equation 1]
$$P_c = (1 - e^2)\cos^2[\phi]$$

According to the present invention, since a region (the single mode waveguide) where a mode is significantly changed or leakage is generated does not exist in a portion (the Y-multiplexer) where the two branching waveguides are coupled, generation of the mode mismatching light (leakage in portions other than the waveguide) is suppressed. In addition, since the multiple mode waveguide has a length equal to or longer than 150 μm, the generated mode mismatching light is rarely recombined with the main output waveguide or the subsidiary output waveguide, so that the mode mismatching light is rarely mixed in the radiation-mode light or the output light. Furthermore, the multiple mode waveguide of the invention has a shape with its width being nearly constant, gradually increasing over 150 μm or longer, or gently changing. In contrast, as shown in FIG. 3(a), the waveguide susceptible to light leakage, in which the shape may be changed to the single mode waveguide, is not suitable for the shape of the multiple mode waveguide of the invention.

Figure 3A:
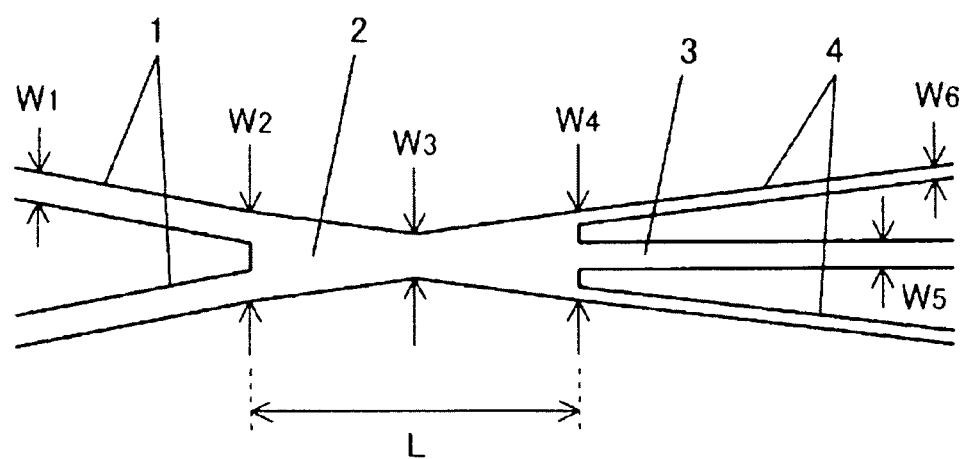
FIGS. 3(*a*) and 3(*b*) are diagrams illustrating a difference of the effects caused by a difference of the shapes of the waveguides in the vicinity of the Y-multiplexer.
Figure 3B:
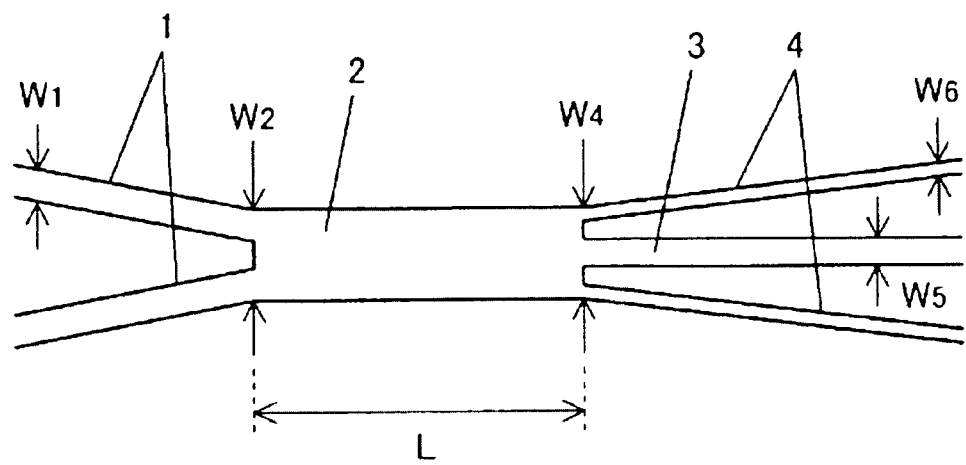

In order to identify the effect of the invention, as shown in FIGS. 3(a) and 3(b), a simulation has been made for two types of waveguide shapes in the vicinity of the Y-multiplexer. FIG. 3(a) illustrates a case where the width of the waveguide changes such that a single mode waveguide is included in the coupling portion between two branching waveguides and three branching waveguides assuming that w1=3.5 μm, w2=w4=8 μm, w3=3 μm, w5=4 μm, and w6=1 μm.

FIG. 3(b) illustrates a waveguide shape in the vicinity of the Y-multiplexer in the optical waveguide according to the invention, in which the coupling portion includes only the multiple mode waveguide. Specifically, it is assumed that w1=3.5 w2=w4=8 μm, w5=4 μm, and w6=1 μm.

Figure 5:
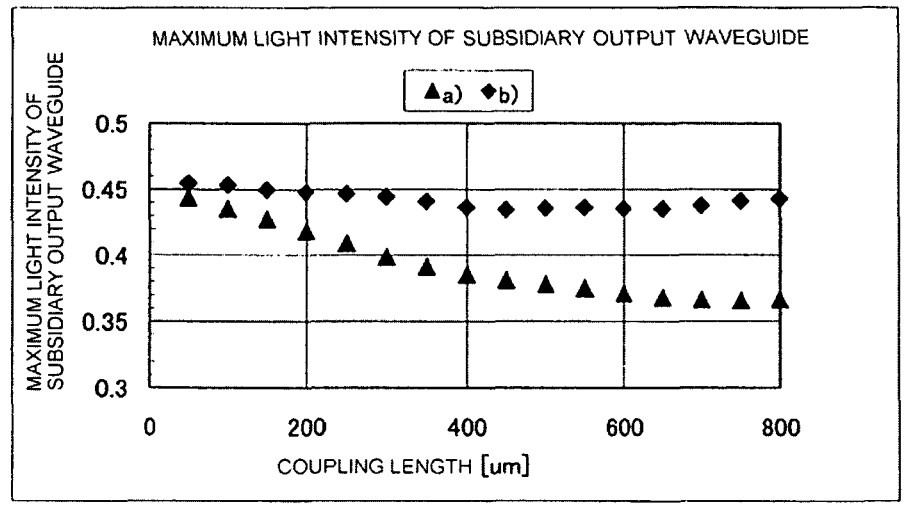
FIG. 5 is a graph illustrating a relationship between the coupling length and the maximum light intensity of the subsidiary output waveguide in both the waveguide shapes in FIGS. 3(*a*) and 3(*b*).

FIG. 5 illustrates change of the maximum light intensity (the output light intensity when the MZ-type modulator is turned off) in the subsidiary output waveguide (the waveguide for outputting the radiation-mode light) as a high-order mode waveguide with respect to change of the length of the coupling length L. As shown in FIG. 5, a difference between FIGS. 3(a) and 3(b) is obviously identified. Consequently, a stable light amount can be obtained by making the coupling portion as a multiple mode waveguide. In addition, as the wavelength of the propagating light wave is shortened, a user feels that the coupling length is longer in the light waves even when the coupling length L of the coupling portion is constant. For this reason, in the shape of FIG. 3(a), as the wavelength of the light wave is shortened, the light intensity change typically increases so that the light intensity changes with, so-called, high wavelength dependence. In contrast, in FIG. 3(b), since the light intensity change is also insignificant, it can be readily appreciated that the wavelength dependence can be suppressed.

Next, in a case where the waveguide in the vicinity of the Y-multiplexer has a shape as shown in FIG. 3(b), and the gap obtained by coupling two branching waveguides is set to 0 μm (ideal width) and 0.8 μm (practical width), the maximum light intensity output from the subsidiary output waveguide was computed and compared. The result is shown in FIG. 6.

Figure 6:
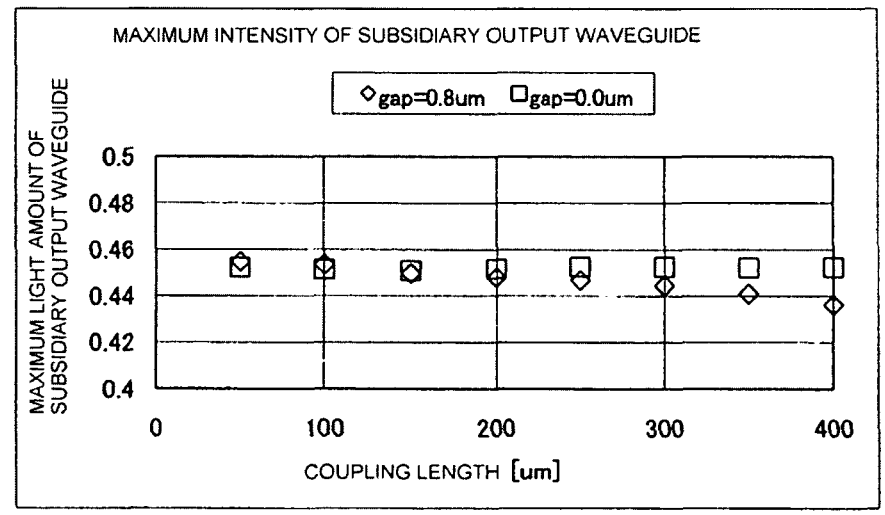
FIG. 6 is a graph illustrating a relationship between the maximum light intensity of the subsidiary output waveguide and the coupling length in a case where the gap of the coupling portion of the two branching waveguides in the waveguide shape of FIG. 3(*b*) is at 0 μm (an ideal value) and 0.8 μm (the width obtained in practice).

Referring to FIG. 6, in a case where the gap is set to 0 μm, the maximum light intensity does not change even when the length L of the coupling portion changes. However, in a case where the gap is set to 0.8 μm, as the length of the coupling portion increases, it is recognized that the maximum light intensity output from the subsidiary output waveguide decreases. This is because the mode mismatching light is generated when a refractive index distribution between the waveguide of the coupling portion and the MZ-arm (branching waveguide) changes by setting the gap to 0.8 μm.

That is, in a range of the coupling length L shorter than 150 μm, a high light intensity approximately equal to that of an ideal state is provided because the mode mismatching light recombines with the subsidiary output waveguide. However, when the coupling length L is equal to or higher than 150 μm, a probability that the mode mismatching light is recombined with the subsidiary output waveguide decreases, so that the maximum light decreases as the waveguide length of the coupling portion increases. In order to suppress degradation of optical characteristics, it is desirable not to couple the mode mismatching light with the subsidiary output waveguide. It is thought that such a condition is obtained when the length L of the coupling waveguide portion is necessarily equal to or longer than 150 μm.

In addition, in the optical modulator of the invention, as shown in FIG. 2, it is preferable that two subsidiary output waveguides 4 be arranged axisymmetrically with respect to the main output waveguide by interposing the main output waveguide 3 therebetween. As a result, it is possible to extract the radiation-mode light as high-order mode light from the signal output light with excellent resolution.

In the optical modulator of the invention, the width w1 of each of the two branching waveguides coupled in the Y-multiplexer shown in FIG. 3(b) is narrower than the width w5 of the main output waveguide, and the width w6 of the subsidiary output waveguide is narrower than the width w1 of the branching waveguide. Therefore, it is possible to approximately match the mode diameter in the coupling portion of the branching waveguide and the mode diameter of the main output waveguide as the single mode waveguide where the light waves are output in the turn-on state. As a result, it is possible to effectively extract the output light from the main output waveguide 3.

The dielectric substrate used in the optical modulator of the invention is preferably a substrate having an electro-optic effect. For example, the dielectric substrate may be made of lithium niobate, lithium tantalate, lead lanthanum zirconate titanate (PLZT), and a quartz-based material. Specifically, the dielectric substrate may include an X-cut plate, a Y-cut plate, and a Z-cut plate of those single-crystalline materials, and particularly, may be configured as an optical waveguide device. Meanwhile, since the dielectric substrate has a high anisotropic property, lithium niobate (LN) may be preferably used. Furthermore, the invention may be preferably applied to an dielectric substrate having a thickness equal to or smaller than 20 μm. This is because mixing of the mode mismatching light with the radiation-mode light or the output light is effectively suppressed because it is possible to suppress generation of the mode mismatching light by applying the invention even when the mode mismatching light is apt to be constricted within a thin plate.

In the optical waveguide, it is possible to form the optical waveguide by diffusing, for example, titanium (Ti) or the like on the surface of the substrate through a thermal diffusion method, a proton-exchange method, and the like. Alternatively, it is also possible to configure the optical waveguide by forming the ridge structure in a portion corresponding to the optical waveguide. Furthermore, a method of using Ti and the like described above and the ridge structure may be used simultaneously.

Figure 4:
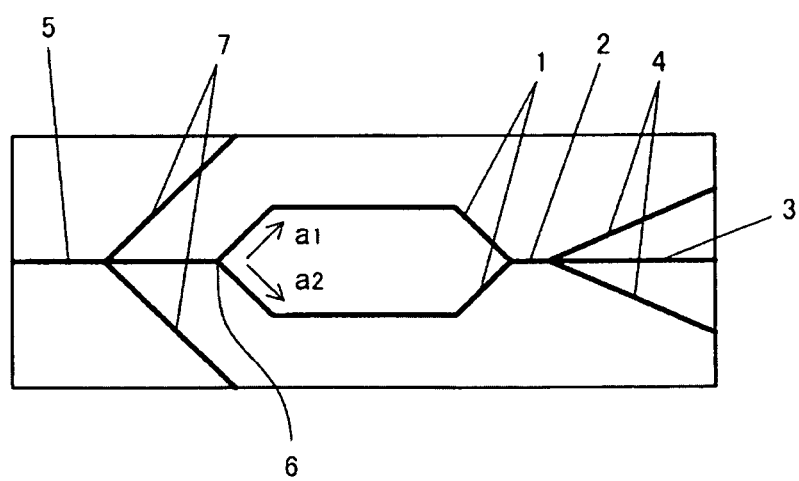
FIG. 4 is a diagram illustrating a condition in which the high-order mode waveguide is connected to the input waveguide.

Furthermore, the optical modulator according to the invention preferably includes a high-order mode waveguide 7 divided from the input waveguide 5 in the middle of the input waveguide 5 before reaching the Y-splitter 6 in the incident side of the Mach-Zehnder type waveguide as shown in FIG. 4. As a result, since the high-order mode light generated in a light input unit and propagating through the input waveguide can be removed from the high-order mode waveguide, it is possible to approximate a dividing ratio (a1:a2) of the light waves in the Y-splitter 6 to 1:1, and further suppress a generation ratio of undesired light in the Y-multiplexer.

INDUSTRIAL APPLICABILITY

As described above, according to the invention, it is possible to suppress generation of the mode mismatching light in the Y-multiplexer of the MZ-type waveguide or mixing of the mode mismatching light with the radiation-mode light or the output light. In addition, it is possible to provide an optical modulator capable of separately extracting the radiation-mode light and the output light with high efficiency.

REFERENCE SIGNS LIST

1 BRANCHING WAVEGUIDE
2 COUPLING PORTION
3 OUTPUT WAVEGUIDE
4 SUBSIDIARY OUTPUT WAVEGUIDE

The invention claimed is:

1. An optical modulator having a Mach-Zehnder type waveguide on a surface of a dielectric substrate, wherein
    a waveguide, after multiplexing in a Y-multiplexer in an output side of the Mach-Zehnder type waveguide, includes only a multiple mode waveguide in its coupling portion,
    two subsidiary output waveguides that are high-order mode waveguides and that guide radiation-mode light are connected to a portion where the multiple mode waveguide is changed to a single mode waveguide that is a main output waveguide guiding signal output light,
    the two subsidiary output waveguides are arranged axisymmetrically with respect to the main output waveguide by interposing the main output waveguide therebetween,
    the multiple mode waveguide has a length equal to or longer than 150 μm,
    a distance between outer edges of two branching waveguides coupled in the Y-multiplexer is equal to a width (W2) of the multiple mode waveguide at a connection point of the branching waveguides with the multiple mode waveguide, and
    a distance between outer edges of the two subsidiary output waveguides is equal to a width (W4) of the multiple mode waveguide at a connection point of the subsidiary output waveguides with the multiple mode waveguide.

2. The optical modulator according to claim 1, wherein a width of each of two branching waveguides coupled in the Y-multiplexer is narrower than a width of the main output waveguide, and a width of the subsidiary output waveguide is narrower than a width of the branching waveguide.

3. The optical modulator according to claim 1, wherein a thickness of the dielectric substrate in the optical modulator is equal to or smaller than 20 μm.

4. The optical modulator according to claim 1, wherein a high-order mode waveguide divided from an input waveguide is provided in the middle of the input waveguide before reaching a Y-splitter in an input side of the Mach-Zehnder type waveguide.

5. The optical modulator according to claim 2, wherein a thickness of the dielectric substrate in the optical modulator is equal to or smaller than 20 μm.

6. The optical modulator according to claim 2, wherein a high-order mode waveguide divided from an input waveguide is provided in the middle of the input waveguide before reaching a Y-splitter in an input side of the Mach-Zehnder type waveguide.

7. The optical modulator according to claim 3, wherein a high-order mode waveguide divided from an input waveguide is provided in the middle of the input waveguide before reaching a Y-splitter in an input side of the Mach-Zehnder type waveguide.

* * * * *